United States Patent
Han et al.

(10) Patent No.: US 8,185,275 B2
(45) Date of Patent: May 22, 2012

(54) SYSTEM FOR VEHICULAR GUIDANCE WITH RESPECT TO HARVESTED CROP

(75) Inventors: Shufeng Han, Urbandale, IA (US); Jiantao Wei, Wichita, KS (US); Francisco Rovira-Mas, Valencia (ES)

(73) Assignee: Deere & Company, Moline, IL (US)

( * ) Notice: Subject to any disclaimer, the term of this patent is extended or adjusted under 35 U.S.C. 154(b) by 1429 days.

(21) Appl. No.: 11/342,760

(22) Filed: Jan. 30, 2006

(65) Prior Publication Data
US 2007/0005208 A1    Jan. 4, 2007

Related U.S. Application Data

(60) Provisional application No. 60/696,364, filed on Jul. 1, 2005.

(51) Int. Cl.
*G05F 7/70* (2006.01)

(52) U.S. Cl. .............. 701/50; 701/23; 701/28; 701/301; 382/104

(58) Field of Classification Search ................ 701/23, 701/28, 301; 382/104
See application file for complete search history.

(56) References Cited

U.S. PATENT DOCUMENTS

| | | | | |
|---|---|---|---|---|
| 4,918,441 A * | 4/1990 | Bohman | ............ | 340/901 |
| 5,103,924 A * | 4/1992 | Walker | ............ | 180/401 |
| 5,410,479 A * | 4/1995 | Coker | ............ | 701/23 |
| 5,430,810 A * | 7/1995 | Saeki | ............ | 382/281 |
| 5,442,552 A * | 8/1995 | Slaughter et al. | ............ | 701/50 |
| 5,675,489 A | 10/1997 | Pomerleau | ............ | 364/424.033 |
| 5,983,161 A | 11/1999 | Lemelson et al. | ............ | 701/301 |
| 6,101,795 A * | 8/2000 | Diekhans | ............ | 56/10.2 F |
| 6,275,773 B1 | 8/2001 | Lemelson et al. | ............ | 701/301 |
| 6,278,918 B1 * | 8/2001 | Dickson et al. | ............ | 701/23 |
| 6,336,051 B1 * | 1/2002 | Pangels et al. | ............ | 700/50 |
| 6,385,515 B1 | 5/2002 | Dickson et al. | ............ | 701/28 |
| 6,389,785 B1 * | 5/2002 | Diekhans et al. | ............ | 56/10.2 F |

(Continued)

FOREIGN PATENT DOCUMENTS

EP    1 529 428 A1    5/2005

(Continued)

OTHER PUBLICATIONS

Gopinath, Sudhir. "Using Color and Shape Analysis for Boundary Line Extraction in Autonomous Vehicle Applications." MS Thesis, Virginia Polytecnic Institute and State University, Dec. 20, 2002.*

(Continued)

*Primary Examiner* — Jack Keith
(74) *Attorney, Agent, or Firm* — Yee & Associates, P.C.; Dawn C. Wolff (57) ABSTRACT

A discriminator identifies windrow pixels associated with a windrow within a collected image. A definer defines a search space with respect to a vehicle. An evaluator determines respective spatial correlations between the defined search space and the windrow pixels for different angular displacements of the search space. An alignment detector or search engine determining a desired vehicular heading as a preferential angular displacement associated with a generally maximum spatial correlation between the defined search space and the windrow pixels. An offset calculator estimates an offset of the vehicle to a central point of the windrow or a depth axis to achieve the desired vehicle heading and desired position of the vehicle with respect to the windrow.

11 Claims, 10 Drawing Sheets
(1 of 10 Drawing Sheet(s) Filed in Color)

U.S. PATENT DOCUMENTS

| | | | |
|---|---|---|---|
| 6,445,983 B1 | 9/2002 | Dickson et al. | 701/23 |
| 6,487,500 B2 | 11/2002 | Lemelson et al. | 701/301 |
| 6,728,608 B2 | 4/2004 | Ollis et al. | 701/28 |
| 6,819,780 B2 * | 11/2004 | Benson et al. | 382/104 |
| 6,839,127 B1 * | 1/2005 | Anderson | 356/5.01 |
| 2002/0106108 A1 * | 8/2002 | Benson et al. | 382/104 |
| 2004/0039498 A1 | 2/2004 | Ollis et al. | 701/23 |
| 2005/0088642 A1 | 4/2005 | Singh et al. | 356/5.01 |
| 2005/0088643 A1 * | 4/2005 | Anderson | 356/5.01 |

FOREIGN PATENT DOCUMENTS

| | | |
|---|---|---|
| WO | 96/17279 | 6/1996 |
| WO | 03/098260 | 11/2003 |

OTHER PUBLICATIONS

Rovira-Mas, F.; Han, S.; Wei, J.; Reid, J.F. *Fuzzy Logic Model for Sensor Fusion of Machine Vision and GPS in Autonomous Navigation*, 2005, ASAE Annual International Meeting, Tampa, FL, USA. ASAE Paper No. 051156.

Ollis, M.; Stentz, A. *Vision-Based Perception for an Automated Harvester*. Robotics Institute, Carnegie Mellon University.

Pinto, F.A.C.; Reid, J.F. *Heading Angle and Offset Determination Using Principal Component Analysis*. 1998. ASAE Paper No. 983113.

Jochem, T.; Batavia, P. *Crop Tracking Phase 2 Final Report*. Applied Perception, Inc.

Ollis, M.; Stentz, A. *First Results in Vision-Based Crop Line Tracking*. Robotics Institute, Carnegie Mellon University.

Zhang, Q.; Reid, J.F.; Noguchi, N. *Agricultural Vehicle Navigation Using Multiple Guidance Sensors*.

Okamoto, H.; Hamada, K.; Kataoka, T.; Terawaki, M.; Hata, S. *Automatic Guidance System with Crop Row Sensor*. Automation Technology for Off-Road Equipment, Proceedings of the Jul. 26-27 Conference. ASAE Publication No. 701P0502. 2002.

Southall, B.; Marchant, J.A.; Hague, T.; Buxton, B.F. *Model Based Tracking for Navigation and Segmentation*. Silsoe Research Institute.

Taylor, S. Intel Integrated Performance Primitives, How to Optimize Software Applications Using Intel IPP. Intel Press, 2004, pp. 207-293.

Reid, J.F.; and Searcy, S.W. *An Algorithm for Computer Vision Sensing of a Row Crop Guidance Directrix*, International Off-Highway & Powerplant Congress and Exposition, 1991, pp. 1-13.

Pomerleau, D. Ralph: Rapidly Adapting Lateral Position Handler, IEEE Symposium on Intelligent Vehicle, Detroit, MI [online], 1995 [retrieved Nov. 18, 2005]. Retrieved from the Internet: <URL:www.cs.cmu.edu/~tjochem/nhaa/ralph.html>.

Jahns, G. *Navigating of Agricultural Field Machinery*, Computers and Electronics in Agriculture, 1999, pp. 1-2.

Reid, J.F.; Zhang, Q.; Noguchi, N.; Dickson, M. *Agricultural Automatic Guidance Research in North America*, Computers and Electronics in Agriculture, 2000, pp. 155-167.

Marchant, J.A. *Tracking of Row Structure in Three Crops Using Image Analysis*, Computers and Electronics in Agriculture, 1996, pp. 161-170.

Astrand, B.; Baerveldt, A. *A Vision Based Row-Following System for Agricultural Field Machinery*, Mechatronics, 2005, pp. 251-269.

Han, S.; Zhang, Q.; Ni, B.; Reid, J.F. *A Guidance Directrix Approach to Vision-Based Vehicle Guidance Systems*, Computers and Electronics in Agriculture, 2004, pp. 179-195.

Wei, J.; Han, S.; Rovira-Mas, F.; Reid, J.F. *A Method to Obtain Vehicle Guidance Parameters from Crop Row Images*. 2005, ASAE Annual International Meeting, Tampa, FL, USA. ASAE Paper No. 051155.

Rovira-Mas, F.; Han, S.; Wei, J.; Reid, J.F. *Fuzzy Logic Model for Sensor Fusion of Machine Vision and GPS in Autonomous Navigation*, 2005, ASAE Annual International Meeting, Tampa, FL, USA. ASAE Paper Number: 051156.

Ollis, M.; Stentz, A. *Vision-Based Perception for an Automated Harvester*. Robotics Institute, Carnegie Mellon University, Sep. 1997.

Zhang, F.M.; Ying, Y.B.; Zhang, Q. *A Robust Approach to Obtain a Crop Edge Based on Wavelet Filter and Fuzzy Recognition*. Automation Technology for Off-Road Equipment, Proceedings of the Oct. 7-8, 2004 Conference, ASAE Publication No. 701P1004, 2004, pp. 36-46.

Rovira-Mas, F.; Zhang, Q.; Reid, J.F.; Will, J.D. *Machine Vision Row Crop Detection Using Blob Analysis and the Hough Transform*. Automation Technology for Off-Road Equipment, Proceedings of the Jul. 26-27, 2002 Conference, ASAE Publication No. 701P0502.

Tsai, R. *An Efficient and Accurate Camera Calibration Technique for 3D Machine Vision*. IBM, T.J. Watson Research Center, 1986, pp. 364-373.

Pinto, F.A.C.; Reid, J.F. *Heading Angle and Offset Determination Using Principal Component Analysis*. 1998. ASAE Paper Number: 983113.

Jochem, T.; Batavia, P. *Crop Tracking Phase 2 Final Report*. Applied Perception, Inc. 2002.

Ollis, M.; Stentz, A. *First Results in Vision-Based Crop Line Tracking*. Robotics Institute, Carnegie Mellon University, Apr. 1996.

Zhang, Q.; Reid, J.F.; Noguchi, N. *Agricultural Vehicle Navigation Using Multiple Guidance Sensors*, 1999.

Okamoto, H.; Hamada, K.; Kataoka, T.; Terawaki, M.; Hata, S. *Automatic Guidance System with Crop Row Sensor*. Automation Technology for Off-Road Equipment, Proceedings of the Jul. 26-27 Conference. ASAE Publication No. 701P0502, 2002.

Southall, B.; Marchant, J.A.; Hague, T.; Buxton, B.F. *Model Based Tracking for Navigation and Segmentation*. Silsoe Research Institute, 1998.

* cited by examiner

SYSTEM FOR VEHICULAR GUIDANCE WITH RESPECT TO HARVESTED CROP

This document (including all drawings) claims priority based on U.S. provisional application Ser. No. 60/696,364, filed Jul. 1, 2005, and entitled, METHOD AND SYSTEM FOR VEHICULAR GUIDANCE USING A CROP IMAGE under 35 U.S.C. 119(e).

FIELD OF THE INVENTION

This invention relates to a method and system for vehicular guidance with respect to windrows or harvested crop lying in a field or on the ground.

BACKGROUND OF THE INVENTION

A vision system may attempt to infer the relative position of a vehicle with respect to harvested crop (e.g., hay) lying on the ground in a field. However, background art vision systems may require excessive computational resources or tend to respond too slowly for real-time navigation of a vehicle. Further, vision systems may be inaccurate because of variations or discontinuities in the windrows, harvested crop rows, or generally rectangular piles of clippings lying in the field. Therefore, a need exists for a robust vision system for vehicle guidance that is less computationally demanding, more responsive, and more resistant to guidance errors associated with variations in the windrows, harvested crop rows, or generally rectangular piles of clippings lying in the field.

SUMMARY OF THE INVENTION

A method and system of guiding a vehicle comprises a discriminator for identifying windrow pixels associated with a windrow within a collected image. A definer defines a search space with respect to a vehicle, where the search space contains a series of scan line segments. An evaluator determines respective spatial correlations between the defined search space and the windrow pixels for different angular displacements of the search space. An alignment detector or search engine determines a desired vehicular heading as a preferential angular displacement associated with a generally maximum spatial correlation between the defined search space and the windrow pixels. A central point is estimated, where the central point is associated with the windrow based on pixel intensity of the windrow pixels. An offset calculator estimates an offset of the vehicle to the central point of the windrow or a depth axis to achieve the desired vehicle heading and desired position of the vehicle with respect to the windrow.

BRIEF DESCRIPTION OF THE DRAWINGS

The file of this patent contains at least one drawing executed on color. Copies of this patent with color drawings will be provided by the Patent and Trademark Office upon request and payment of the necessary fee.

DESCRIPTION OF THE PREFERRED EMBODIMENT

Figure 1:
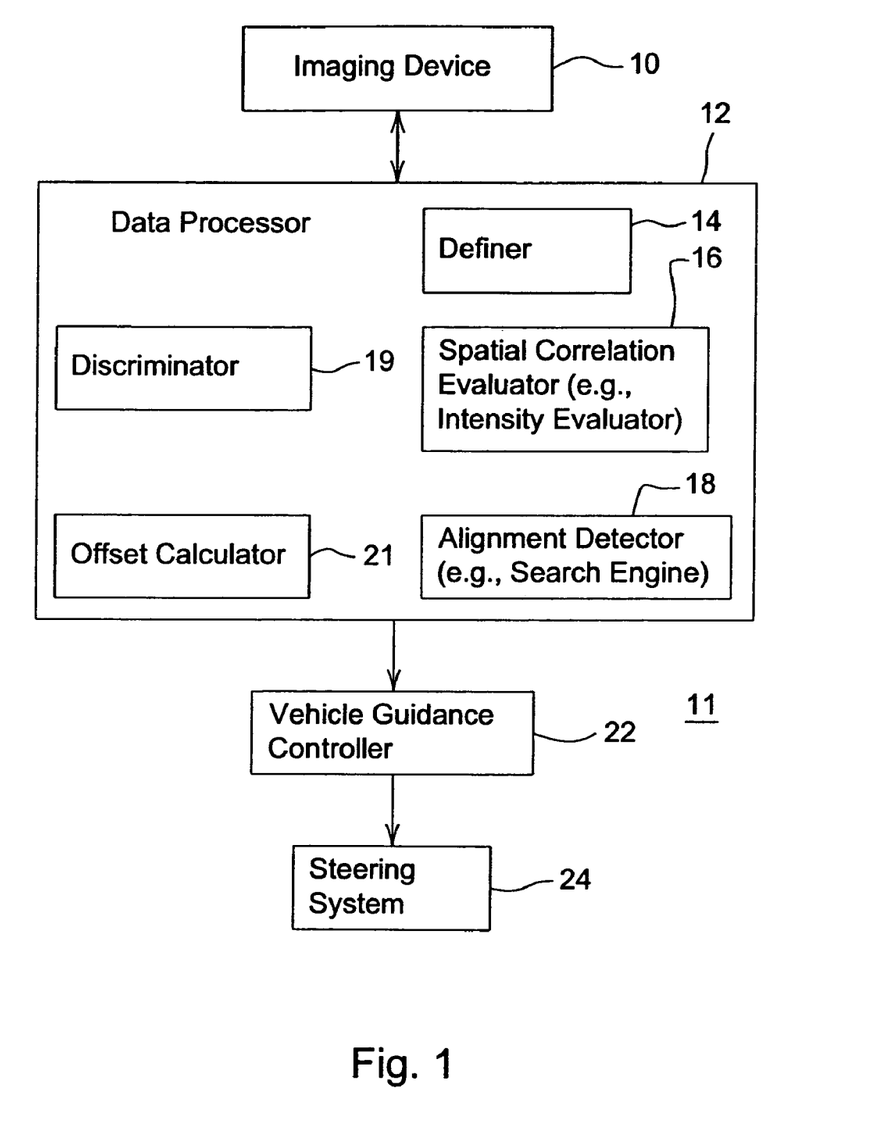
FIG. 1 is a block diagram of one embodiment of a system for vehicular guidance.

In accordance with one embodiment of the invention, FIG. 1 shows a vehicular guidance system 11 that comprises an imaging device 10 coupled to a data processor 12. The data processor 12 communicates with a vehicle guidance controller 22. In turn, the vehicle guidance controller 22 directly or indirectly communicates with a steering system 24.

The imaging device 10 is used to collect one or more images from the perspective of a vehicle. The image may contain crop image data, background data, or both. The crop image data may represent a windrow or harvested crop lying on the ground and arranged in one or more rows or generally rectangular piles. The data processor 12 may process the collected images to identify the relative position of a vehicle with respect to the crop image (e.g., windrow or row of harvested crop lying on the ground).

The imaging device 10 may comprise a camera using a charged-coupled device (CCD), a complementary metal oxide semiconductor (CMOS), or another sensor that generates color image data, RGB color data, CMYK color data, HSV color data, or image data in other color space. RGB color data refers to a color model in which red, green and blue light (or signals or data representative thereof) are combined to represent other colors. Each pixel or group of pixels of the collected image data may be associated with an intensity level (e.g., intensity level data) or a corresponding pixel value or aggregate pixel value. In one embodiment, the intensity level is a measure of the amount of visible light energy, infra-red radiation, near-infra-red radiation, ultraviolet radiation, or other electromagnetic radiation observed, reflected and/or emitted from one or more objects or any portion of one or more objects within a scene or within an image (e.g., a raw or processed image) representing the scene, or portion thereof.

The intensity level may be associated with or derived from one or more of the following: an intensity level of a red component, green component, or blue component in RGB color space; an intensity level of multiple components in RGB color space, a value or brightness in the HSV color space; a lightness or luminance in the HSL color space; an intensity, magnitude, or power of observed or reflected light in the green visible light spectrum or for another plant color;

an intensity, magnitude, or power of observed or reflected light with certain green hue value or another plant color; and an intensity, magnitude, or power of observed or reflected light in multiple spectrums (e.g., green light and infra-red or near infra-red light). For RGB color data, each pixel may be represented by independent values of red, green and blue components and corresponding intensity level data. CMYK color data mixes cyan, magenta, yellow and black (or signals or data representative thereof) to subtractively form other colors. HSV (hue, saturation, value) color data defines color space in terms of the hue (e.g., color type), saturation (e.g., vibrancy or purity of color), and value (e.g., brightness of the color). For HSV color data, the value or brightness of the color may represent the intensity level. HSL color data defines color space in terms of the hue, saturation, and luminance (e.g., lightness). Lightness or luminance may cover the entire range between black to white for HSL color data. The intensity level may be associated with a particular color, such as green, or a particular shade or hue within the visible light spectrum associated with green, or other visible colors, infra-red radiation, near-infra-red radiation, or ultraviolet radiation associated with plant life.

Although other imaging devices may be used, one illustrative example of an imaging device 10 is a SONY DFW-X710 camera (SONY Electronics Inc., Park Ridge, N.J.). The imaging device 10 may be associated with a transverse axis and may be associated with scan lines of the image data that extend generally perpendicular to the transverse axis.

The scan lines or scan line segments represent a group of generally parallel line segments which may extend into the depth (or depth axis) of the world coordinate system with respect to the imaging device 10. Each scan line segment is separated from an adjacent scan line segment by a spatial separation (e.g., predetermined spatial separation). In one embodiment, the scan line segments are generally bounded by a rectangle search region (e.g., which may be defined in terms of Xmin, Xmax, Ymin, Ymax); the length of scan line segment is limited by the depth dimension (Ymin, Ymax) in the world space. Further, in one embodiment each scan line may be represented as a two-dimensional array of pixel values or intensity levels.

The scan lines are not transmitted by the imaging device 10, but are received by the imaging device 10 within at least one of the visible light spectrum, the infra-red light spectrum, the near infra-red light spectrum, and the ultraviolet light spectrum. If the imaging device 10 collects data over both the visible light spectrum and the infra-red spectrum, it is possible to assess the crop color in greater detail than with visible light alone. Although the maximum number of scan lines may be determined based on the maximum resolution of the imaging device 10, in one illustrative configuration, the number of scan lines may be reduced from the maximum number available to reduce the processing resources or computational resources required by the data processor 12.

In one embodiment, the data processor 12 comprises a discriminator 19, a definer 14, a spatial correlation evaluator 16, an alignment detector 18 (e.g., search engine), and an offset calculator 21. The discriminator 19 facilitates distinguishing harvested crop image data (e.g., windrow image data or windrow pixels) from background image data (e.g., background pixels). The windrows may comprise any harvested crop (e.g., hay straw or forage), plant clippings, rakings, or vegetative materials that are arranged in rows or piles on the ground, for example. The background image data may comprise image data or pixels associated with the unharvested remainder of the harvested crop and other background matter distinct from the unharvested remainder. The unharvested remainder may be referred to as crop stubble, mowed vegetation with intact roots, or vegetation other than the windrows. Other background matter may comprise the ground, soil, the sky or horizon, buildings, vehicles, among other possibilities. The discriminator 19 facilitates distinguishing a primary color (e.g., drying or harvested plant color) of the windrow image data (e.g., windrows pixels) with respect to a secondary color or colors (e.g. growing plant color) of the background image data. The discriminator 18 may assign a discrimination value or state value to each pixel of the image data, a corresponding bit map, or another data representation. Each discrimination value or state value indicates whether a bit is crop image data or not, or a probability indicative of whether or not a bit is windrow image data or a window pixel.

The definer 14 may define the orientation and configuration of scan lines with respect to the vehicle. The definer 14 may relate the imaging coordinates of the scene with the vehicular coordinates of scene or real world coordinates. If the imaging device 10 is mounted in a fixed position with respect to the vehicle, the vehicular coordinates of the scene and the imaging device 10 may be related by a translation and/or rotation in two or three dimensions.

An spatial correlation evaluator 16 (e.g., intensity evaluator) determines the intensity level of various points that lie on or along the scan lines within the search space (e.g., generally rectangular search space) in the collected image data. The intensity level may be indicated by the value of pixels or voxels associated with crop image data in HSV color space, by the green intensity level of pixels or voxels in RGB color space, or by another measure of pixel intensity.

For each scan line segment in the search space of the image space, an average value or mean value of scan line intensity (or pixel values) may be used as the intensity level (or pixel level). The spatial correlation evaluator 16 determines an average value or mean value for the intensity level or pixel level by summing substantially all (or most) of the pixel values (e.g., derived from intensity level) that are on the scan line segment within the search space and dividing the sum by the number of pixels associated with a scan line segment within the search space, or an estimate thereof. The scan line segment may have two or more states or values for each pixel (e.g., sufficient intensity level versus insufficient intensity level). Because of the perspective view of the scan lines, the fixed length (which may be expressed as the difference between Ymax and Ymin), when projected to the image space no longer appears to be fixed. Accordingly, the mean or average value of the scan line intensity level or pixel level represents an objective score of a scan line intensity in image space that is not affected by any potential perceived change in the fixed length of the scan lines from a perspective view.

The alignment detector 18 determines whether or not the vehicle heading is aligned with the windrows or one or more harvested crop rows lying on the ground. The scan line segments may be virtually projected onto or into the search space of image space based on hypothesized attitude (e.g., yaw, pitch, and roll angles) in one or more dimensions within a search space to determine a preferential attitude in (e.g., yaw, pitch, and roll angle) in one or more dimensions that indicates substantial alignment of the scan lines with one or more windrows, harvested rows of crop, generally rectangular piles of hay, straw, forage, clippings, or other plant materials, for example. In one example, the alignment detector 18 comprises a search engine for searching the intensity level data for a sufficiently high intensity level that meets or exceeds a scan line threshold intensity value with the search space and corresponds to a desired heading of the vehicle. Respective intensity level data may be associated with a corresponding scan line or a corresponding segment thereof within the search space. The scan lines may be identified by scan line identifier or spatial coordinates, either in the image space of the imaging device 10 or real world. The intensity level data may be defined as an aggregate intensity level associated with a corresponding segment of a scan line or the average, mean or mode intensity level of a corresponding segment of a scan line may be tracked.

The alignment detector 18 or data processor determines a desired heading, a vehicular offset, or both for the vehicle. The desired heading angle is the angle between the vehicle centerline and the desired path. The desired path may be associated with a tire, wheel, or track of the vehicle traveling in or over the ground or area between adjacent harvested crop rows or windrows and generally parallel to the crop rows or windrows. The vehicular offset refers to the displacement or distance the vehicle is off from the desired path of a vehicle. For instance, the vehicular offset may refer to the displacement of a reference point on the vehicle (e.g., vehicle COG (center of gravity)) with respect to the desired path. The vehicular offset of the vehicle with respect to the crop image data is generally much smaller than the lateral view range of the imaging device 10.

In one configuration, the alignment detector 18 determines a preferential heading angle for a time interval and the offset calculator 21 determines a corresponding vehicular offset for time interval or a generally overlapping time interval. The vision guidance system 11 may be used to infer the relative position of the vehicle with respect to a crop feature, such as harvested crop rows, or one or more windrows. In addition, the vision guidance system 11 may be configured to detect the end of the row of harvested materials or vegetation clippings, to detect obstacles, or to detect weed infested areas.

The vehicle guidance controller 22 may determine guidance parameters for the vehicle based on the preferential heading, the vehicular offset, or both. The guidance parameters may comprise control signals, error signals, control data, error data messages, or the like that contain information on the preferential heading angle and vehicular offset to control steering. For example, the control signals may comprise a steering control signal or data message that is time dependent and defines a steering angle of the steering shaft.

The vehicle guidance controller 22 uses the guidance parameters or directrix to control the steering system 24. For example, the guidance parameters may direct the vehicle generally parallel to harvested crop rows, one or more windrows, or another crop feature. The work vehicle may comprise a baler, a round baler, a square baler, a wire baler, a mowing unit, mower, a raker, a pick-up unit, a cutter, a forage harvester, a tractor (e.g., with or without an implement or attachment), or other agricultural or lawn and garden equipment. A baler may be used to collect cuttings of crop (e.g., hay, stray or forage) and package or bind the bales with twine, cord, wire, or another binding means.

The steering system 24 may comprise an electrically controlled hydraulic steering system, an electrically driven rack-and-pinion steering, an Ackerman steering system, or another steering system. The steering system 24 may actuate an electro-hydraulic (E/H) unit or another actuator to turn one or more wheels.

Figure 2:
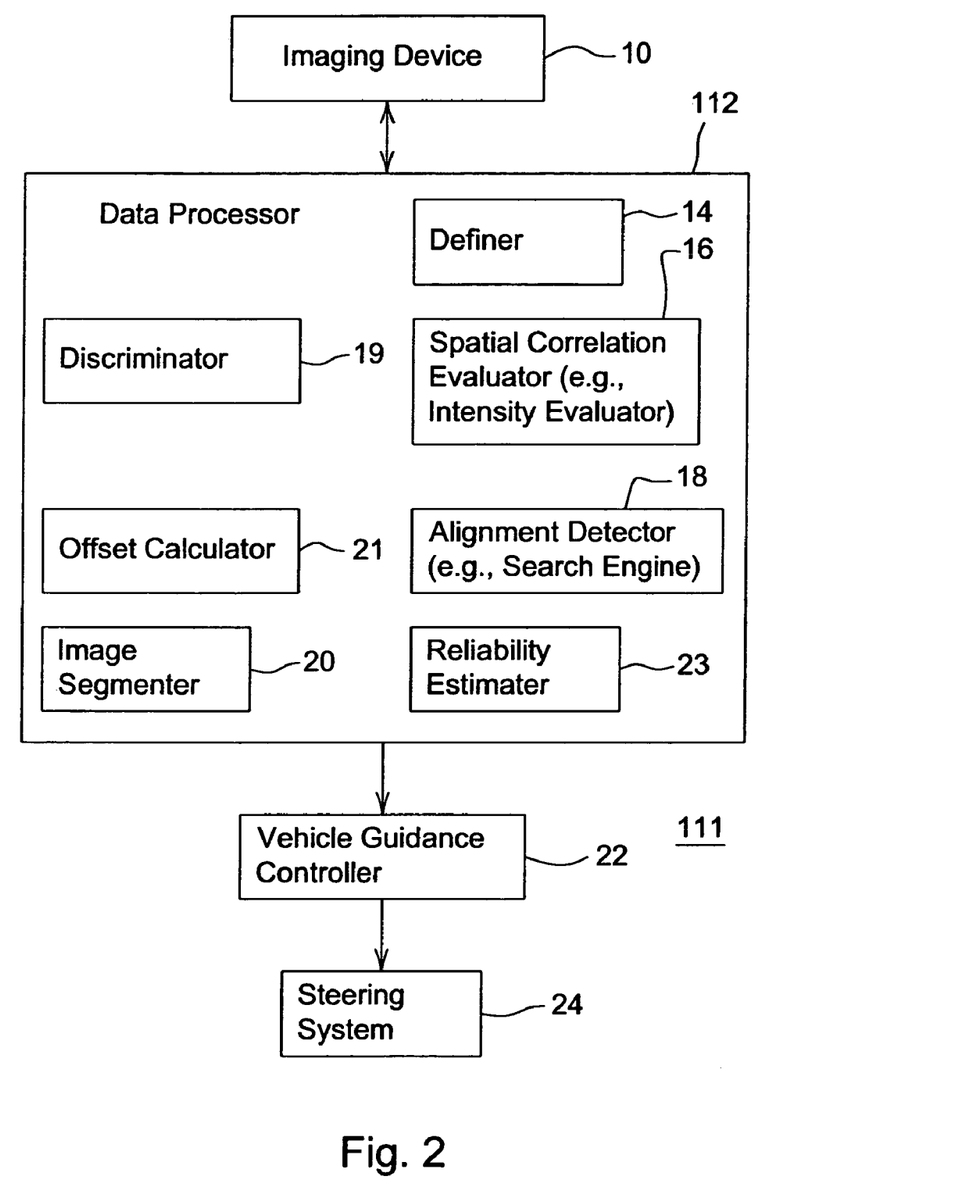
FIG. 2 is a block diagram of another embodiment of a system for vehicular guidance.

The vehicular guidance system 111 of FIG. 2 is similar to the vehicular guidance system 11 of FIG. 1, except the vehicular guidance system 111 of FIG. 2 further comprises an image segmenter 20 and a reliability estimator 23. The discriminator 19 may cooperate with the image segmenter 20 to produce a segmented image. The image segmenter 20 may remove or filter information from the color collected image data to produce a grey-scale, mono-chrome, color, HSV or other segmented image data that excludes background data or all scene data outside of the windrows or harvested crop image data. For example, the segmented image data may be expressed as binary image data, where a pixel value may have one of two states (e.g., sufficient intensity value or insufficient intensity value).

The reliability estimator 23 estimates a reliability of the preferential vehicle heading based on compliance with a correlation value associated with the alignment of the search space and the windrow or windrow pixels. The reliability estimator 23 may evaluate the intensity level criteria associated with one or more windrows of the crop image data. The reliability estimator 23 may use one or more of the following factors to determine whether or not a preferential heading derived from vision data is sufficiently reliable for guidance of a machine during a time interval or period: (1) whether the intensity value (e.g., a first intensity value) of a first windrow differs from the intensity value (e.g., a second intensity value) of a second windrow by more than a minimum threshold; (2) whether the spacing between a first windrow and a second windrow falls within a defined row width range; (3) whether a maximum intensity value of the first windrow and the second windrow is greater than a certain threshold value; and (4) whether the intensity value (e.g., designated a first intensity value) of a first windrow and the intensity value (e.g., second intensity value) of a second windrow are individually or collectively less than a corresponding predetermined threshold. The reliability estimator 23 may use one or more of the following factors to determine whether or not a vehicular offset derived from vision data is sufficiently reliable for guidance of a machine during a time interval or period: (1) whether the determined offset is less than or equal to a maximum offset value; and (2) whether the determined offset is less than or equal to a spacing between adjacent windrows.

Figure 3:
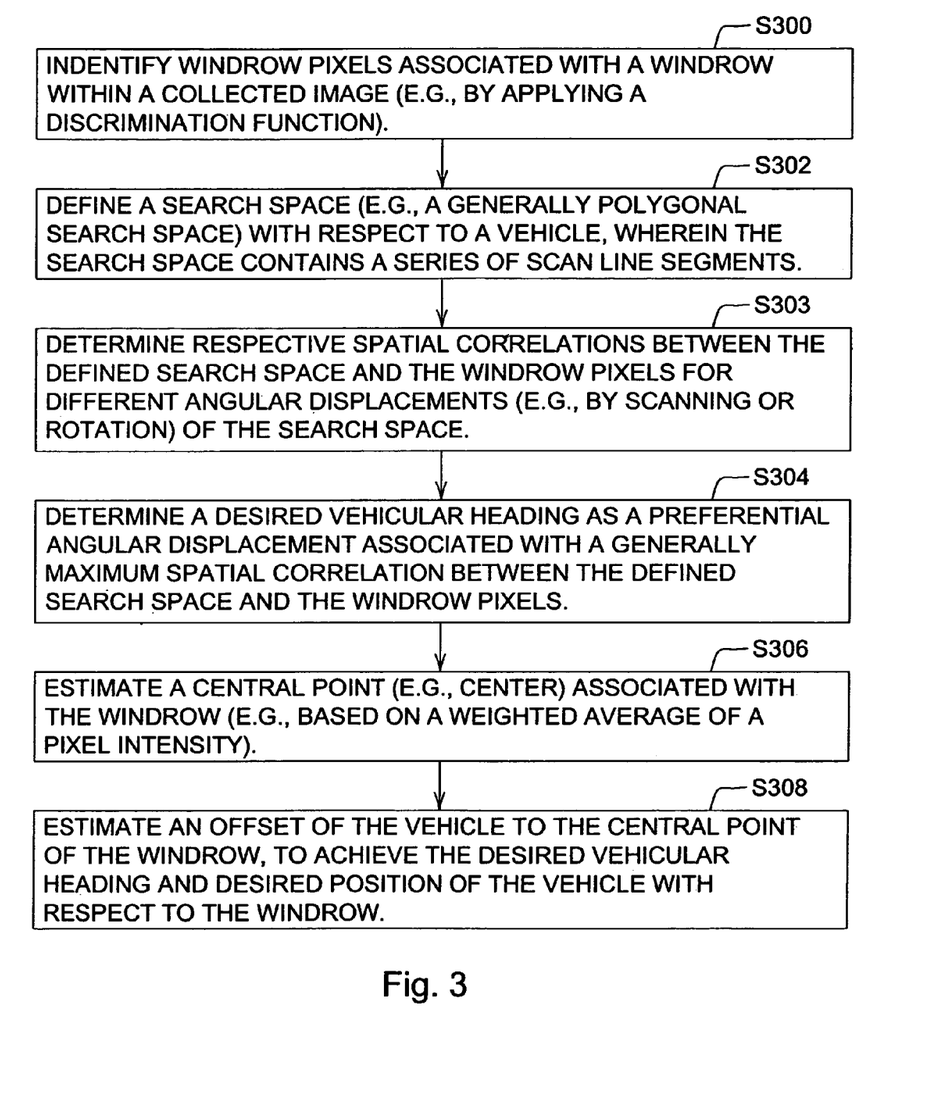
FIG. 3 is a flow chart of a first embodiment of a method for guiding a vehicle with respect to a windrow or harvested crop row.

FIG. 3 shows a method for guiding a vehicle using crop image data (e.g., crop rows). The method of FIG. 3 begins in step S300.

In step S300, a discriminator 19 or data processor (12 or 112) identifies windrow pixels or windrow image data within a collected image. For example, the discriminator 19 may apply a discrimination function to identify windrow pixels and background pixels or to distinguish windrow pixels from background pixels. Windrow means a row or generally linear pile of hay, grain or another crop raked up or otherwise arranged on the ground for drying or otherwise. A windrow may be gathered as part of the bailing process to create bales of hay or another crop.

The windrow image data may be characterized by its dried vegetation color content, whereas the harvested crop image data (e.g., crop stubble or recovering crop) may be characterized by other distinctive color content (e.g., which may vary with rainfall, soil moisture, precipitation, temperature, humidity, cumulative sunlight or other environmental factors and the genetic constitution of the particular crop).

In one example, the discriminator 19 may apply a Linear Discriminant Analysis (LDA) method to develop a classification model to segment harvested crop image data (e.g., hay or windrow) from background image data. LDA is a data classification algorithm which maximizes the ratio of between-class variance to within-class variance. The classes may be defined such that a first class represents windrow image data and a second class represents background image data. The Linear Discriminant Analysis or variation thereof may be applied as follows. The Red, Green, and Blue values of a pixel form a data set X (RGB vector). During training, regions of crop image data (e.g., the first class) and background image data (e.g., the second class) may be manually selected as training inputs for the LDA algorithm to establish reference crop image data and reference background image data. Coefficients of Discriminant Function (DFC) $C_j$ and $Co_j$ (j=0 indicating crop image data, or 1 indicating background image data) were derived through the following steps:

(1) Calculating the mean of the vector for each class, index_mean$_j$,
(2) Calculating the covariance matrix for each class, cov$_j$,
(3) Calculating the average of the covariance matrix, cov_mean, for all classes, and
(4) Deriving the DFC:

$$C_j = \text{index\_mean}_j \times (cov\_mean)^{-1}; \quad (1)$$

$$Co_j = -0.5 \times C_j \times \text{index\_mean}_j \quad (2)$$

After the DFC's are acquired using the training data, the DFC's can be used to calculate the discriminant functions (DF) for each evaluated pixel:

$$DF_j = C_j \times X + Co_j \quad (3)$$

where X is the evaluated pixel's RGB vector.

In one embodiment, a pixel is classified into the class that had the largest value of DF.

Figure 5A:
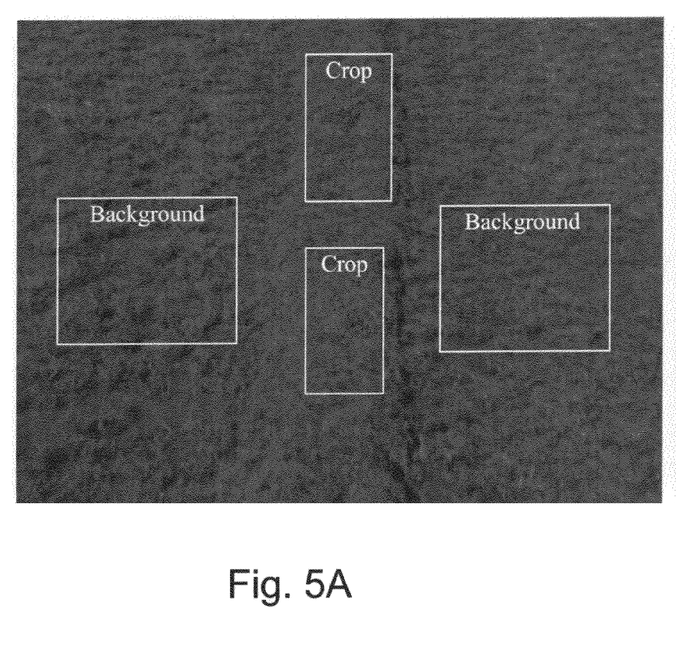
FIG. 5A is a raw image with selected training areas.

FIG. 5A shows the collected raw image with selected training areas for defining reference harvested image data and reference background image data. The image characteristics of the reference harvested image data and the reference background image data are stored for future reference and comparisons to determine whether a portion of a collected image or collected pixels represents harvested image data (e.g., windrow pixels) or background image data (e.g., background pixels).

Figure 5B:
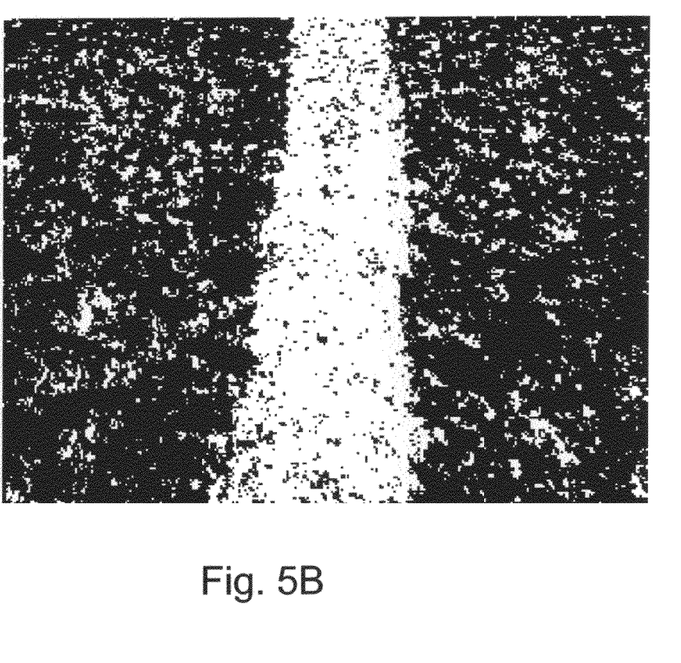
FIG. 5B is a segmented image that identifies crop pixels or windrow pixels.

FIG. 5B shows a segmented image that uses the LDA algorithm or another data classification scheme. After image segmentation, the crop image pixels may be set to a first value (e.g., one) and background image pixels may be set to a second value (e.g., zero) distinct from the first value.

Figures 6, 8:
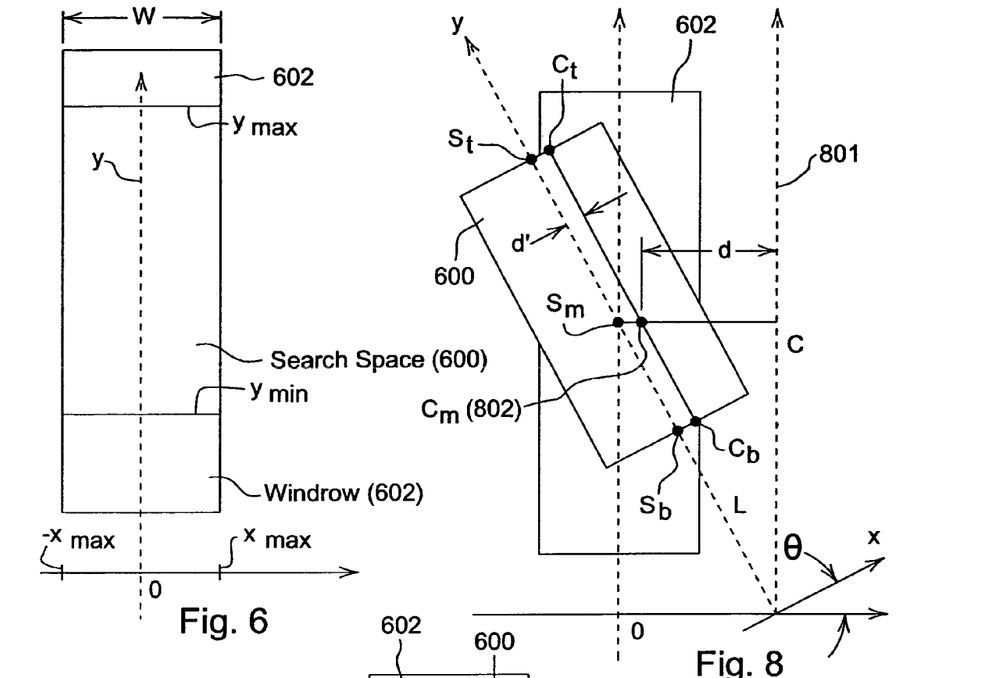
FIG. 6 is an illustrative diagram of a search space and an associated windrow.
FIG. 8 is an illustrative diagram of determining an offset of the vehicle with respect to the desired heading angle.

In step S302, the definer 14 or data processor (12 or 112) determines a search space (e.g., a generally polygonal search space) with respect to a vehicle, where the search space contains a series of scan line segments. FIG. 6 provides a graphical illustration of a search space 600, which may be defined in a first dimension (e.g., transverse or longitudinal direction) from $-X_{max}$ to $X_{max}$ and in a second dimension (e.g., depth or latitudinal direction) from $Y_{min}$ to $Y_{max}$. The search space 600 overlies a windrow 602, which is exposed above and below the search space 600. Although the windrow may have any width and is not necessarily aligned with the search space, as illustrated in FIG. 6, the windrow is a rectangular area with a width of $X_{max} - (-X_{max}) = 2 X_{max} = W$.

In step S302, a definer 14 or data processor 12 defines a series of scan line segments within the search space that one generally perpendicular to a transverse axis of the vehicle or to an imaging transverse axis of an imaging device 10. For example, in the image space the scan lines project out from the front of the vehicle in a direction of travel toward the windrows. The definer 14 or data processor 12 may align an imaging coordinate system of the scene with a vehicle coordinate system of the scene.

Figure 7:
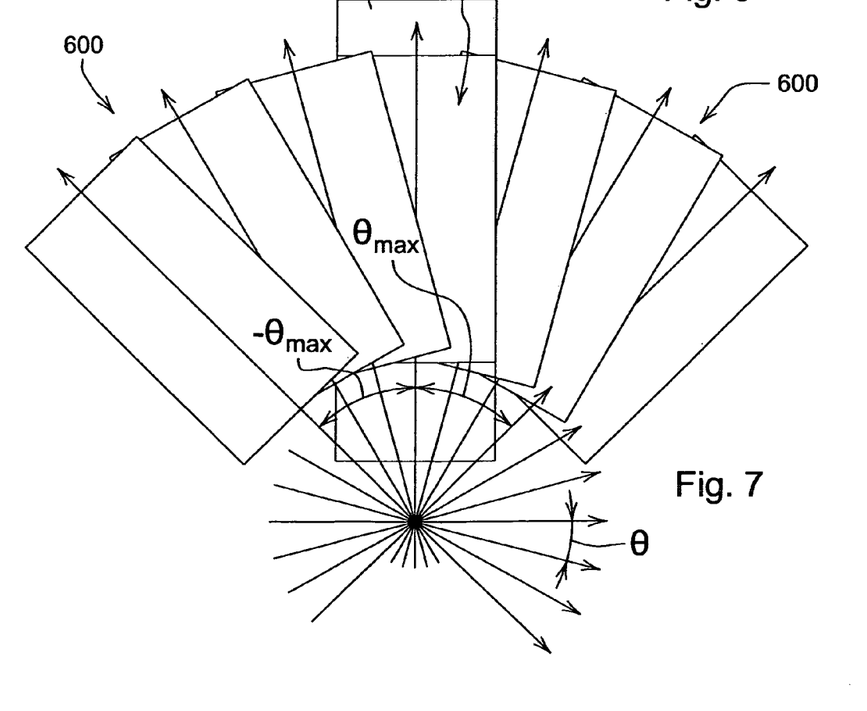
FIG. 7 is an illustrative diagram of a search for a desired heading angle of the vehicle.

In step S303, the data processor (12 or 112) or evaluator 16 determines respective spatial correlations between the defined search space and the windrow (or windrow pixels) for different angular displacements (e.g., by scanning or rotation of the search space.) FIG. 7 illustrates the angle heading search. Like reference numbers in FIG. 6 and FIG. 7 indicate like elements. FIG. 7 shows the heading search procedure may be carried out by rotating the search space 600 and the world-based coordinate system along the origin from $-\theta_{max}$ to $\theta_{max}$ with an angle resolution (step) of $\Delta\theta$ or otherwise. When the search space 600 overlaps with the windrow 602 or windrow pixels, the intersection area (correlation) between the search space and windrow will reach a maximum. The rotational angle at this position of maximum intersection or overlap represents the vehicle's desired heading angle ($\theta$) to track the windrow. The spatial correlations generally vary when heading angles are at different positions indicated in FIG. 7.

In step S304, the data processor (12 or 112) or alignment detector 18 determines a desired vehicular heading angle as a preferential angular displacement associated with a generally maximum spatial correlation between the defined search space and the windrow pixels. The maximum spatial correlation is where the polygonal search space overlaps with the identified windrow pixels to maximum extent. The amount of overlap may be determined in accordance with various techniques that may be applied alternately or cumulatively.

Under a first technique, if the respective scan line intensities within the search space meet or exceed a scan line threshold intensity value, the maximum spatial correlation between the define search space and the windrow pixels is established. The scan line threshold intensity value may be determined based on empirical studies, field tests, or otherwise as an indicator of maximum correlation between the search space and the windrow pixels. The respective scan line intensities within the search space may be determined based on one or more of the following: (a) an average or mean scan line intensity for scan line segments within the search space, (b) a mode scan line intensity for scan line segments within the search space, and (c) an aggregate scan line intensity for scan line segments within the search space.

Under a second technique, the maximum spatial correlation between the search space and the windrow pixels is established by applying Green's theorem, Stoke's theorem, differential geometry, or other applications of multidimensional integrals or calculus to evaluate the extent of overlap between the search space area (bounded by a first boundary) and a windrow area (bounded by a second boundary).

In step S306, the data processor (12 or 112) or offset calculator 21 estimates a central point (e.g., center) associated with a windrow. In one example, the data processor can estimate a central point of the windrow as a weighted average of windrow pixel intensity covered by one or more scan lines. In one implementation of the foregoing weighted average of the windrow pixel intensity, higher weights are assigned to windrow pixels that are bounded by other adjacent windrow pixels or that have a certain minimum density or population of windrow pixels in a given local region of the image data; lower weights are assigned to windrow pixels that are not bounded by other adjacent windrow pixels or that have less than a minimum density of windrow pixels in a given local region of the image data. In FIG. 8, the central point 802 of the windrow is indicated by centerpoint $C_m$ associated with a central axis $C_b C_t$. The search space axis (indicated by $S_b S_t$) may be coextensive with a scan line segment.

In step S308, the data processor (12 or 112) estimates an offset (e.g., transverse offset) of the vehicle to the central point of the windrow or a depth axis 801 to achieve the desired vehicle heading and desired position of the vehicle with respect to the windrow. In one embodiment, the offset may be configured to align or register a scan line segment with a central point (e.g., central axis) of the windrow. When the desired heading angle is found, the central point (e.g., centerpoint $C_m$ or windrow central axis ($C_bC_t$)) of the windrow can be calculated by weighted average of pixel intensities covered by the scan lines. The corrective distance (d') between the search space axis ($S_bS_t$) and central axis ($C_bC_t$) is the lateral displacement of windrow from the desired position, whereas the offset (d) may be measured with respect to a depth axis 801.

A control point is defined as the point to determine the offset of the tracking or steering of the vehicle from a desired position and desired heading. The control point is associated with a central point of the windrow or any point along the central axis $C_bC_t$, or an extension thereof. The offset (d) at the control point that is L long from the origin O along the central axis $C_bC_t$ may be determined by the following equation(s):

d=L*sin(θ)−d'/cos(θ) or d=L*sin(θ)d'/cos(θ), where L is a scan line axis, d is the offset or transverse distance between the scan line axis and a depth axis, e is an angle between the depth axis and the scan line axis, and d' is the distance between center of the search space axis ($S_bS_t$) line and central axis $C_bC_t$ at the control point (e.g., associated with $S_m$ and/or $C_m$). The offset d varies with the displacement between the actual position and the desired position with the desired heading angle. By convention, d is positive if the windrow is oriented to the right of the search space with respect to the direction of travel and d is negative if the windrow is oriented to the left of the search space.

When L=0, the control point is very close to origin (0) of the coordinate system and coextensive with the position of the imaging system, the offset d is solely determined by d' and heading angle θ. When the offset is 0 at the imaging device's position, the front wheel(s) of the vehicle usually may crush or run over the windrow or harvested row of crop. Therefore, control point at L=0 (close to origin) may not guide the vehicle as effectively as a control point at L>0 does. Accordingly, an alternative control point of L>0 is preferably selected based the geometry of the work vehicle and the position of the imaging system on the work vehicle. The alternative control point is selected such that the front wheel(s) will not travel on the windrow or harvested crop. In an alternate embodiment, the control point can also be selected to be in the center ($C_m$, FIG. 8) of a defined scan line segment or to be near a bottom ($C_b$, FIG. 8) of the scan line segments. Accordingly, the imaging system looks ahead a farther distance as guidance goal, which may be regarded as somewhat equivalent to changing the gain of vehicular guidance controller 22 (e.g., steering controller).

FIG. 7 illustrates vision directrix calculations of a vision guidance system that may be used to correct or modify the receiver directrix calculations of a location-determining receiver (e.g., Global Positioning System Receiver with differential correction) associated with the vehicle. If the control point is at $C_m$, the receiver-determined offset (e.g., GPS-based offset) is generally equal to vision offset of the vision guidance system. The receiver offset is independent of control point, whereas the vision offset will depend on where the control point is.

Figure 4:
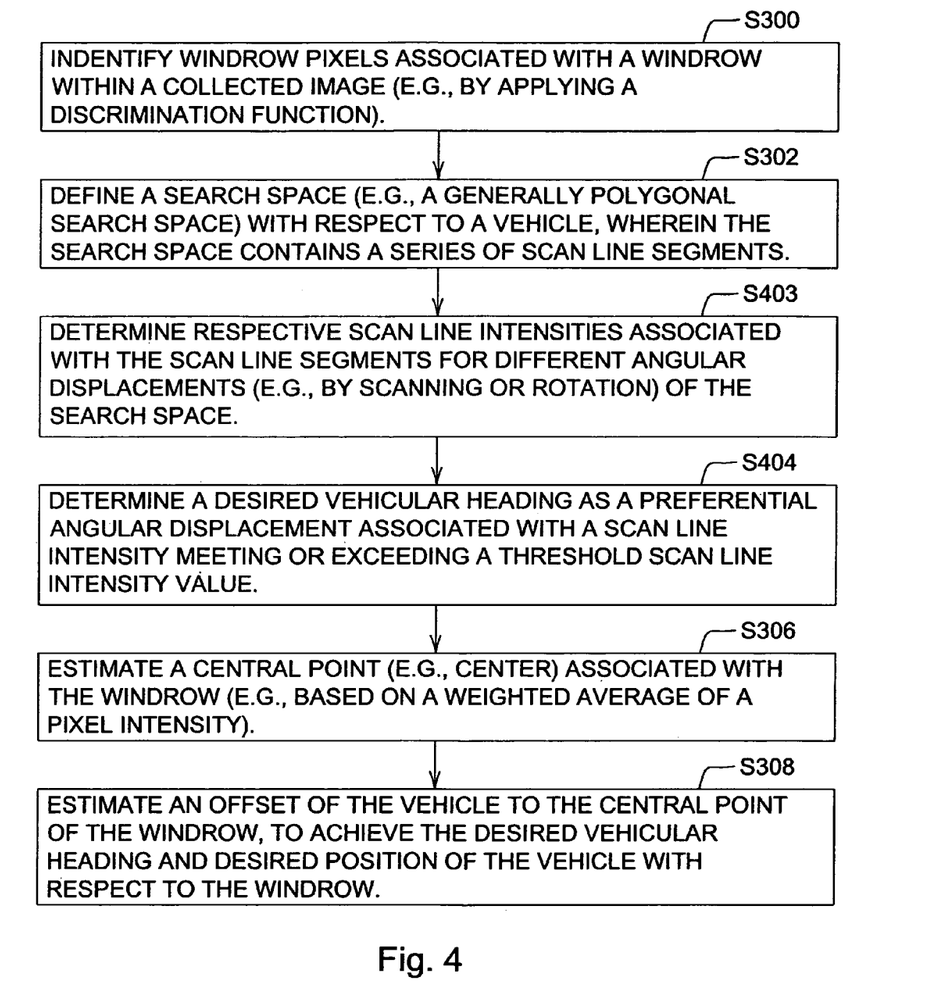
FIG. 4 is a flow chart of a second embodiment of a method for guiding a vehicle with respect to a windrow or harvested crop row.

The method of FIG. 4 is similar to the method of FIG. 3, except steps S303 and S304 are replaced with step S403 and S404, respectively. Like reference numbers indicate like steps or procedures in FIG. 3 and FIG. 4.

Step S403 may follow step S302. In step S403, a data processor (12 or 122) or evaluator 16 determines respective scan line intensities associated with the scan line segments for different angular displacements (e.g., by scanning or rotation) of the search space. For example, the spatial correlation evaluator 16 may determine scan line intensity data for each of the scan line segments within the search space with respect to corresponding harvested crop image data (e.g., windrows). Step S403 may be carried out in accordance with various techniques that may be applied independently or cumulatively.

Under a first technique, the spatial correlation evaluator 16 determines an average or mean scan line intensity for a corresponding scan line segment associated with the collected image data for a corresponding angular displacement, among different angular displacements. The spatial correlation evaluator 16 may determine the average or mean scan line intensity for each scan line segment within the search space, or a portion thereof, for a corresponding angular displacement, among different angular displacements.

Under a second technique, the spatial correlation evaluator 16 determines a mode scan line intensity for a corresponding scan line segment for a corresponding angular displacement, among different angular displacements. The spatial correlation evaluator 16 may determine the mode scan line intensity for each scan line (or segment) within the search space, or a portion thereof, for a corresponding angular displacement, among different angular displacements.

Under a third example, the spatial correlation evaluator 16 determines an aggregate scan line intensity for a corresponding segment of a scan line for a corresponding angular displacement, among different angular displacements. Here, the spatial correlation evaluator 16 may determine a sum of the intensity values associated with each pixel or voxel along a scan line or generally intercepting it within the search space, or a portion thereof.

In step S404, a data processor (12 or 112) or alignment detector 18 determines a desired vehicular heading as a preferential angular displacement associated with a scan line intensity meeting or exceeding a threshold scan line intensity value. For example, an alignment detector 18 (e.g., search engine) identifies a desired heading of the vehicle that is generally aligned with respect to windrows (e.g., or harvested rows of crop, associated with the crop image data, based on the determined scan line intensity meeting or exceeding a threshold scan line intensity value). The threshold scan line intensity value may comprise a reference value that is associated with a first reliability level (e.g., 99 percent reliability or probability) of identifying a maximum intensity level (or sufficiently high intensity level indicative of substantial alignment with a crop feature) of a scan line or group of pixels in the image data under defined ambient light conditions. The threshold scan line intensity value may be determined by empirical studies, trial-and-error, field tests, or otherwise, and may vary with the type of vegetation (e.g., corn versus soybeans), vegetation status or health (e.g., plant tissue nitrogen level) and the ambient lighting conditions, for instance. In one example, the desired heading of the vehicle is consistent with tracking one or more windrows. In another example, the desired path of travel of the vehicle is selected to efficiently gather or collect the harvested crop, or otherwise. If the vehicle is in a generally aligned state with respect to the harvested crop or one or more windrows, a vehicle may track a desired path that is generally parallel to the harvested crop or one or more windrows.

Figure 9A:
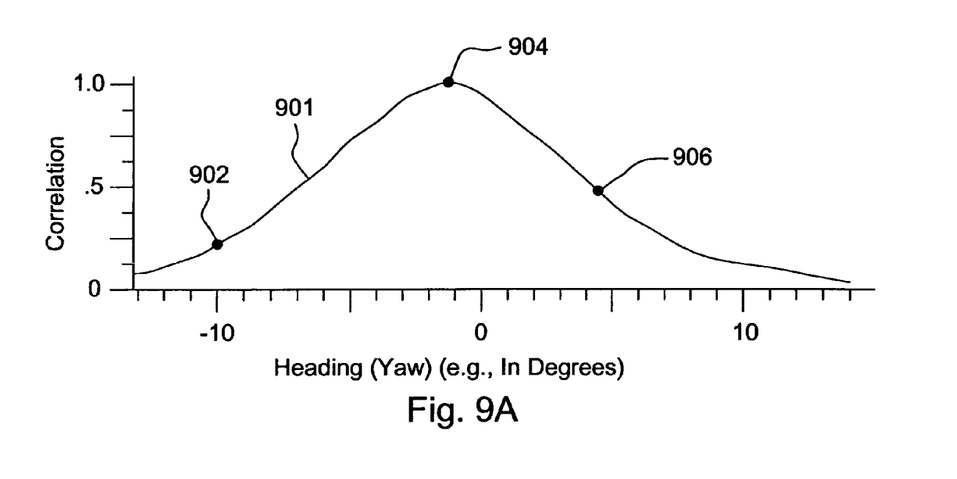
FIG. 9A is a graph of an illustrative correlation between the search space and the windrow versus heading (yaw) of the vehicle.

FIG. 9A is a graph of correlation between the search space and the windrow versus heading (yaw) of the vehicle. The horizontal axis represents the heading (yaw, which may be expressed in degrees) of the vehicle, whereas the vertical axis represents correlation (e.g., normalized correlation) or an analogous correlation score between the search space alignment and the windrow.

Figure 9B:
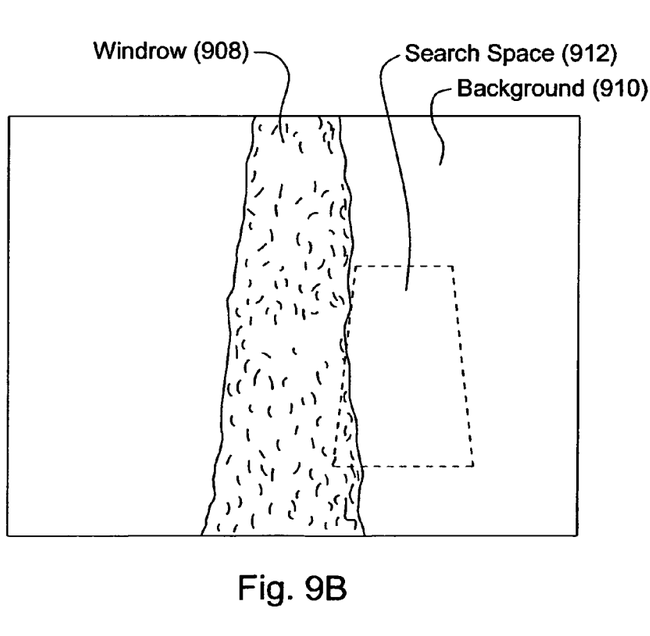
FIG. 9B through FIG. 9D indicate views of a field from the perspective looking toward the direction of travel vehicle that show various alignments (e.g., and their associated correlations) of the search space with respect to the windrow.
Figure 9C:
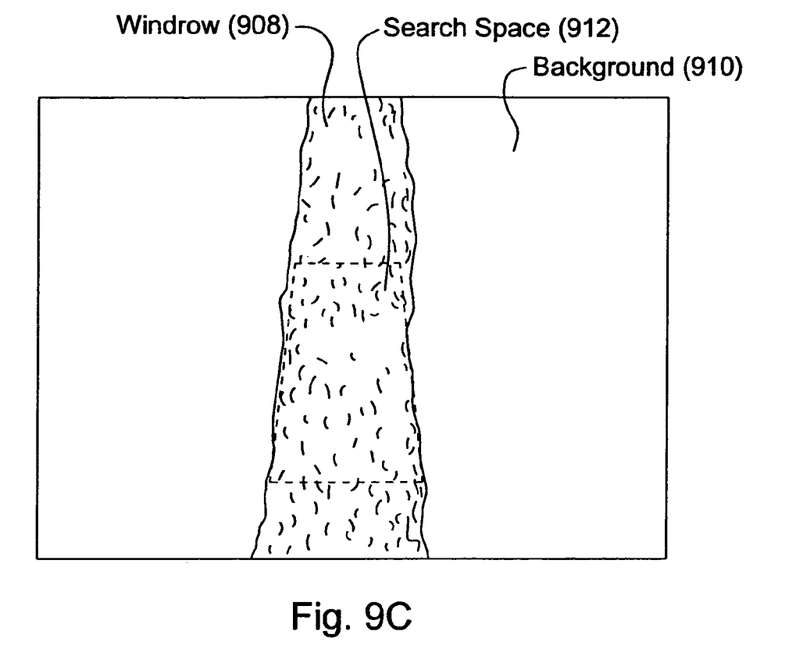

FIG. 9B through FIG. 9C indicate image views of a field from the perspective of the direction of travel vehicle that show various alignments (e.g., and their associated correlations) of the search space 912 with respect to the windrow 908. Each image of FIG. 9B through FIG. 9D includes a windrow 908, background 910, and a search space 912.

In FIG. 9B, the search space 912 is positioned to the right of the windrow 908, and the heading (yaw) of the vehicle is approximately −10 degrees with a corresponding correlation (e.g., score) of less than 0.25. The alignment of FIG. 9B corresponds to point 902 in the graph of FIG. 9A.

In FIG. 9C, the search space 912 is aligned with respect to the windrow, and the heading of the vehicle is approximately 0 degrees with a corresponding correlation of approximately one. The alignment of FIG. 9C is representative of a desired heading and is reflected in point 904 of FIG. 9A.

Figure 9D:
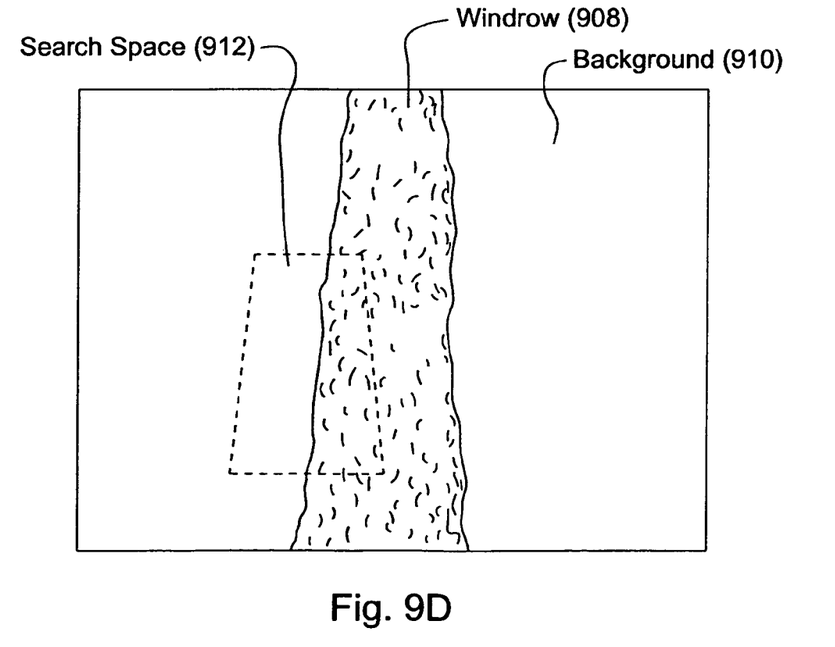

In FIG. 9D, the search space is positioned to the left of the windrow, and the heading (yaw) of the vehicle is approximately 5 degrees with a corresponding correlation (e.g., score) of less than 0.5. The alignment of FIG. 9D corresponds to point 906 in the graph of FIG. 9D.

Figure 10:
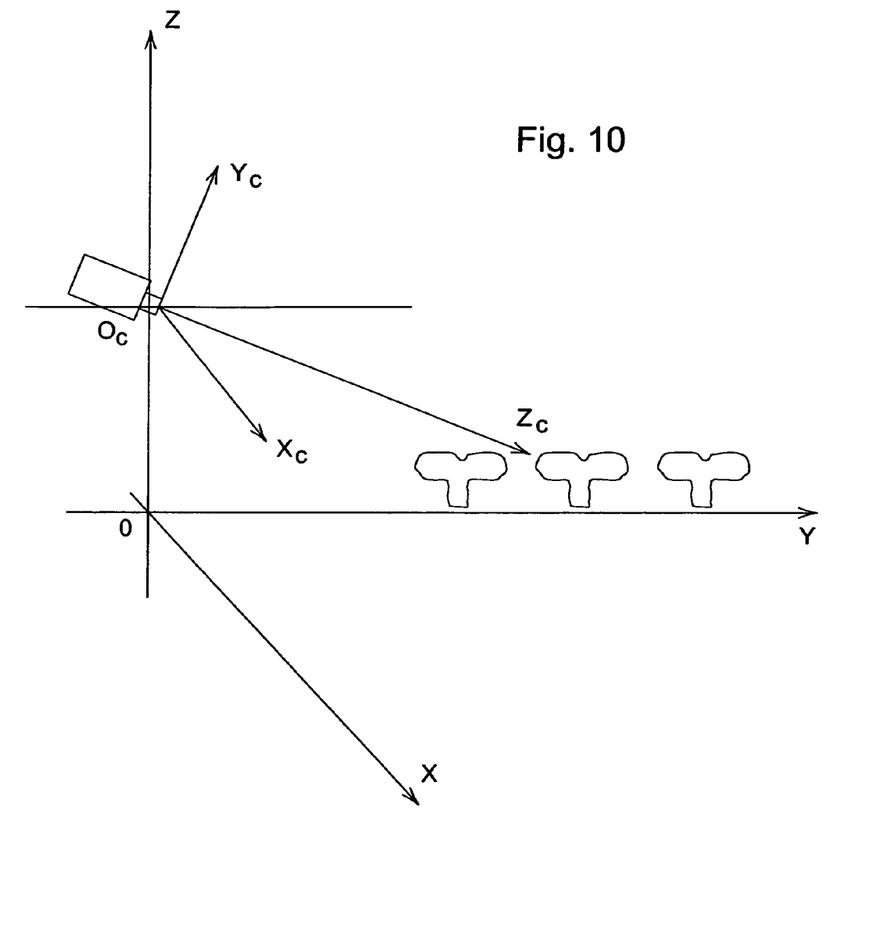
FIG. 10 is a diagram that illustrates an imaging coordinate system.

As shown in FIG. 10, the world coordinate system may be defined with respect to the vehicle coordinate system. In the vehicle coordinate system, the vehicle forward direction is regarded as the Y direction, the vehicle lateral direction is designated X, and vertical direction is designated Z. X is also referred to as the transverse axis of the vehicle. The vehicle coordinates in FIG. 10 are the equivalent of (XY plane) world coordinates.

The imaging coordinate system (e.g., $X_c Y_c Z_c$ in FIG. 10) is an imaging device centered coordinate system. The $X_c$-axis defines an axis that extends laterally (e.g., linearly from a left-to-right direction); the $Y_c$-axis defines an axis that extends upward (e.g., linearly from a low-to-high direction); and the $Z_c$-axis follows the optical or physical centerline of a lens of the imaging device 10. The $X_c$-axis is also referred to as the transverse axis of the imaging device or imaging system. World coordinate and imaging coordinate systems both belong to world space. However, an when an object is projected into the imaging device 10, the formed two dimensional image data lies in the image space, as opposed to world space.

The imaging device 10, the definer 14, or the data processor 12 may calibrate the image data to transform a point's coordinates in world space to its corresponding pixel's coordinates in image space (e.g., image plane). Calibration of the imaging device 10 includes extrinsic parameters and intrinsic parameters. Extrinsic parameters define how to transform an object from world coordinates to imaging coordinates in world space. Extrinsic parameters include the camera's three dimensional coordinates in the world coordinate system and its pitch, roll, and yaw angles. Once the installation of the imaging device 10 is fixed, extrinsic parameters do not need to change. Intrinsic parameters define how to transform an object from world space to image space. The intrinsic parameters include the camera's focus length, its image center in the image plane, and related distortion coefficients. The intrinsic parameters are fixed for a given imaging device 10 and lens. Various algorithms may be employed to map a point from the world space to a point in the two dimensional image plane, or vice versa.

In any of the embodiments or methods disclosed herein, the heading search may be conducted in world space or in image space. For each combination of (yaw, pitch), a mapping table between all the points in the scan lines in world space and their corresponding pixel coordinates in image space (e.g. image plane) is established in the algorithm's initialization phase. The points in scan lines that are outside of image window will be truncated and marked as not available in the mapping table. After the mapping is done, it is straightforward to calculate the intensity along a certain scan line or scan lines by finding the value of the pixels lying on it. If the guidance parameters are calculated in the image space first, then those guidance parameters are transformed into the world space.

Figure 11:
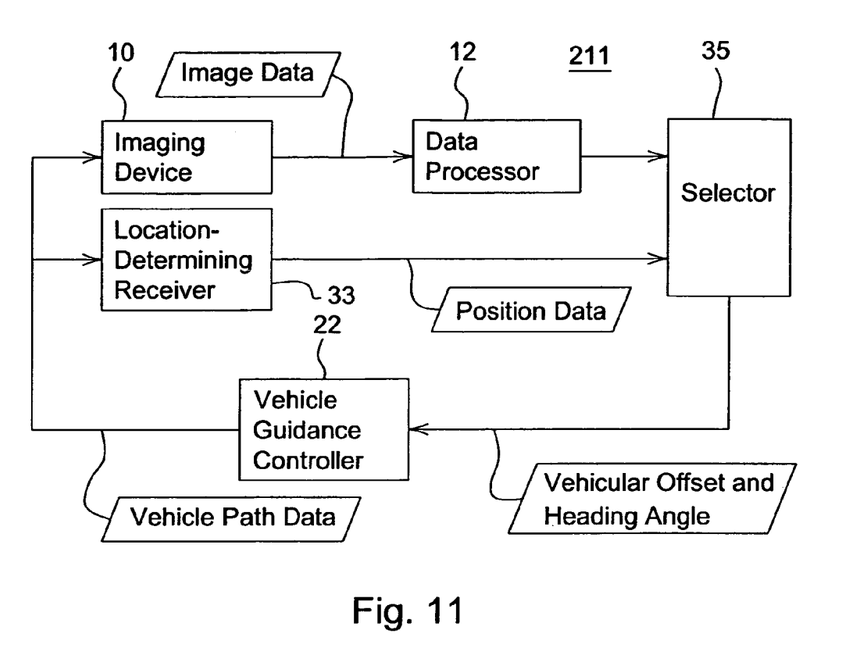
FIG. 11 is a block diagram of yet another embodiment of a system for vehicular guidance.

The guidance system 211 of FIG. 11 is similar to the vision guidance system 11 of FIG. 1 or the vision guidance system of FIG. 2, except the guidance system of FIG. 11 further includes location-determining receiver 33 and a selector 35. Like reference numbers in FIG. 1, FIG. 2 and FIG. 15 indicate like elements.

The location determining receiver 33 may comprise a Global Positioning System (GPS) receiver with or without differential correction. The location-determining receiver 33 provides an alternate guidance data or position data when the imaging device 10 and data processor 12 produce generally unreliable data during a time period (e.g., an interval). In contrast, if the location-determining receiver 33 fails or is unreliable because of satellite dropouts or unreliable communication between the vehicle and a base station that transmits differential correction information (e.g., operating in the RTK mode), the imaging device 10 may provide reliable guidance information, subject to the determination of the reliability estimator 23.

The selector 35 may use the reliability estimator 23 to determine whether to apply image data from the imaging device 10 or position data from the location-determining receiver 33 to guide the vehicle in accordance with a vehicular offset and preferential heading angle. Once the vehicle is moved in accordance with the vehicular offset and preferential heading angle, the captured image data reflect the new vehicle position with respect to crop rows. Thus, the guidance system 211 may be operated as a closed-loop control system in which vehicle path data provides feedback or other reference information to the imaging device 10 and the location determining receiver 33.

Having described the preferred embodiment, it will become apparent that various modifications can be made without departing from the scope of the invention as defined in the accompanying claims.

The following is claimed:

1. A system of guiding a vehicle, the system comprising:
   a discriminator for identifying windrow pixels associated with a windrow within a collected color image, identifying a primary color of the windrow pixels and one or more secondary colors of background pixels, and assigning a discrimination value to each pixel in the identified windrow pixels, wherein the discrimination value indicates whether the each pixel is crop image data or background image data, and wherein each pixel in the collected color image is associated with an intensity level;
   a definer for defining a search space with respect to a vehicle, the search space containing a series of scan line segments, wherein the series of scan line segments has scan line intensities based on the intensity level in the each pixel in the collected color image;
   an evaluator for determining respective spatial correlations between the defined search space and the windrow pixels for different angular displacements of the search space, wherein the respective spatial correlations are based on scan line intensities associated with the scan line segments for different angular displacements;

an alignment detector for determining a desired vehicle heading as a preferential angular heading associated with a generally maximum spatial correlation between the defined search space and the windrow pixels; and an offset calculator for identifying a desired offset of the vehicle that is generally aligned with respect to the windrow, associated with the collected color image, consistent with the desired vehicle heading.

2. The system according to claim 1 wherein the respective spatial correlations are based on an average or mean scan line intensities for corresponding scan line segments within the search space.

3. The system according to claim 1 wherein the respective spatial correlations are based on a mode scan line intensities for corresponding scan line segments within the search space.

4. The system according to claim 1 wherein the respective spatial correlations are based on aggregate scan line intensities for scan line segments within the search space.

5. The system according to claim 1 wherein the desired vehicular heading comprises a preferential angular displacement associated with a scan line intensity within the search space meeting or exceeding a threshold scan line intensity value.

6. The system according to claim 1 further comprising:
a segmenter for deriving a segmented image of crop rows as the crop image data from the collected color image.

7. The system according to claim 1, further comprising:
a reliability estimator for estimating a reliability of the preferential angular heading based on compliance with a correlation value associated with the alignment of the search space and the windrow pixels, wherein the reliability estimator evaluates the intensity level associated with one or more windrows based on the intensity level associated with the each pixel in the collected color image.

8. The system according to claim 1, wherein the discriminator is capable of identifying the windrow pixels by:
calculating the mean of a vector for each class in a number of classes, $\text{index\_mean}_j$, wherein the number of classes include a first class representing windrow pixels and a second class representing background pixels, wherein the vector is a data set comprising a number of values for the each pixel, and wherein the mean of the vector is used to form the discrimination value assigned to the each pixel in the identified windrow pixels;
calculating the covariance matrix for each class, $\text{cov}_j$;
calculating the average of the covariance matrix, $\text{cov\_mean}$, for all classes; and
deriving the coefficients of discriminant function:

$$C_j = \text{index\_mean}_j \times (\text{cov\_mean})^{-1};$$

$$Co_j = -0.5 \times C \times \text{index\_mean}_j.$$

9. The system according to claim 8, wherein responsive to deriving the coefficients of discriminant function, the coefficients of discriminant function are used to calculate the discriminant functions for each pixel evaluated:

$$DF_j = C \times X + Co_j,$$

wherein X is the vector of the each pixel evaluated.

10. A system of guiding a vehicle, the system comprising:
a discriminator capable of identifying windrow image data associated with a harvested crop in a collected color image and background image data in the collected color image based on color and capable of assigning a discrimination value to each portion of image data identified in the collected color image based on whether the each portion is window image data or background image data;

a definer capable of defining a search space with respect to a vehicle, the search space containing a series of scan line segments;

an evaluator capable of determining respective spatial correlations between the defined search space and the windrow image data for different angular displacements of the search space, wherein the respective spatial correlations are based on scan line intensities associated with the scan line segments for different angular displacements;

an alignment detector capable of determining a desired vehicle heading as a preferential angular heading associated with a generally maximum spatial correlation between the defined search space and the windrow image data; and an offset calculator capable of identifying a desired offset of the vehicle that is generally aligned with respect to the windrow, associated with the collected color image, consistent with the desired vehicle heading.

11. The system of claim 10, wherein the each portion of image data identified is selected from one of pixels and bit maps.

* * * * *